(12) United States Patent
Huang et al.

(10) Patent No.: US 11,973,243 B2
(45) Date of Patent: Apr. 30, 2024

(54) BATTERY, POWER CONSUMPTION DEVICE, AND METHOD AND DEVICE FOR PRODUCING BATTERY

(71) Applicant: CONTEMPORARY AMPEREX TECHNOLOGY CO., LIMITED, Ningde (CN)

(72) Inventors: Xiaoteng Huang, Ningde (CN); Chenyi Xu, Ningde (CN); Langchao Hu, Ningde (CN); Junxiang Ma, Ningde (CN); Haiqi Yang, Ningde (CN); Jun Liu, Ningde (CN); Peng Wang, Ningde (CN); Zhanyu Sun, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/355,702

(22) Filed: Jul. 20, 2023

(65) Prior Publication Data
US 2023/0361425 A1    Nov. 9, 2023

Related U.S. Application Data

(63) Continuation of application No. PCT/CN2022/076872, filed on Feb. 18, 2022.

(51) Int. Cl.
| H01M 10/48 | (2006.01) |
| H01M 50/30 | (2021.01) |
| H01M 50/317 | (2021.01) |

(52) U.S. Cl.
CPC ....... H01M 50/394 (2021.01); H01M 10/482 (2013.01); H01M 50/317 (2021.01);
(Continued)

(58) Field of Classification Search
CPC .. H01M 50/394; H01M 50/317; H01M 50/30; H01M 50/39
See application file for complete search history.

(56) References Cited

U.S. PATENT DOCUMENTS

| 8,895,177 B2 | 11/2014 | Marchio et al. |
| 2012/0129024 A1* | 5/2012 | Marchio ............. H01M 10/647 429/120 |

(Continued)

FOREIGN PATENT DOCUMENTS

| CN | 106785182 A | 5/2017 |
| CN | 111952515 A | 11/2020 |

(Continued)

OTHER PUBLICATIONS

The World Intellectual Property Organization (WIPO) International Search Report and Written Opinion for PCT/CN2022/076872 dated Oct. 10, 2022 13 pages (including English translation).

(Continued)

*Primary Examiner* — Kenneth J Douyette
(74) *Attorney, Agent, or Firm* — ANOVA LAW GROUP, PLLC

(57) ABSTRACT

A battery includes a battery cell having a first wall provided with a pressure relief mechanism configured to be actuated when internal pressure or temperature of the battery cell reaches a threshold, a fire-fighting pipeline configured to accommodate a fire-fighting medium and discharge the fire-fighting medium when the pressure relief mechanism is actuated, a first fixing member disposed on a side of the fire-fighting pipeline close to the first wall and provided with first and second limiting parts, and a second fixing member disposed on a side of the fire-fighting pipeline away from the first wall and provided with third and fourth limiting parts. The third and first limiting parts match each other to fix the fire-fighting pipeline between the first and second fixing (Continued)

members. The fourth and second limiting parts match each other to limit the second fixing member in an extending direction of the fire-fighting pipeline.

17 Claims, 9 Drawing Sheets

(52) U.S. Cl.
CPC .... *H01M 2200/10* (2013.01); *H01M 2200/20* (2013.01); *H01M 2220/20* (2013.01)

(56) References Cited

U.S. PATENT DOCUMENTS

| | | | |
|---|---|---|---|
| 2021/0074973 A1 | 3/2021 | Kim et al. | |
| 2021/0113871 A1* | 4/2021 | Huang | H01M 10/425 |
| 2022/0013755 A1 | 1/2022 | Chen et al. | |
| 2022/0013851 A1 | 1/2022 | Zeng et al. | |

FOREIGN PATENT DOCUMENTS

| | | |
|---|---|---|
| CN | 112018302 A | 12/2020 |
| CN | 112018321 A | 12/2020 |
| CN | 112018462 A | 12/2020 |
| CN | 112086604 A | 12/2020 |
| CN | 112086605 A | 12/2020 |
| FR | 1559036 A | 3/1969 |
| UA | 1066483 A1 | 1/2001 |

OTHER PUBLICATIONS

The European Patent Office (EPO) The Exended European Search Report for Application No. 22920979.6 Mar. 21, 2024 11 Pages.

* cited by examiner

BATTERY, POWER CONSUMPTION DEVICE, AND METHOD AND DEVICE FOR PRODUCING BATTERY

CROSS-REFERENCE TO RELATED APPLICATION

This application is a continuation of International Application No. PCT/CN2022/076872, filed on Feb. 18, 2022, the entire content of which is incorporated herein by reference.

TECHNICAL FIELD

The present application relates to the field of battery technologies, and in particular, to a battery, a power consumption device, and a method and device for producing a battery.

BACKGROUND

Energy saving and emission reduction are the key to the sustainable development of the automotive industry. In this case, electric vehicles have become an important part of the sustainable development of the automotive industry due to their advantages of energy saving and environmental protection. For the electric vehicles, the battery technology is an important factor for their development.

In the development of the battery technology, in addition to improving the performance of batteries, safety is also an issue that cannot be ignored. If the safety of the batteries cannot be ensured, the batteries cannot be used. Therefore, how to enhance the safety of the battery is a technical problem urgently to be solved in the battery technology.

SUMMARY

The present application provides a battery, a power consumption device, and a method and device for producing a battery, which could improve safety performance of the battery.

In a first aspect, a battery is provided. The battery includes a battery cell, a first wall of the battery cell being provided with a pressure relief mechanism, and the pressure relief mechanism being configured to be actuated when an internal pressure or temperature of the battery cell reaches a threshold, to relieve the internal pressure; a fire-fighting pipeline configured to accommodate a fire-fighting medium and the fire-fighting pipeline being configured to discharge the fire-fighting medium when the pressure relief mechanism is actuated; a first fixing member, disposed on a side of the fire-fighting pipeline close to the first wall, the first fixing member being provided with a first limiting part and a second limiting part; and a second fixing member, disposed on a side of the fire-fighting pipeline away from the first wall, the second fixing member being provided with a third limiting part and a fourth limiting part, the third limiting part and the first limiting part being matched with each other to fix the fire-fighting pipeline between the first fixing member and the second fixing member, the fourth limiting part and the second limiting part being matched with each other to limit the second fixing member in a first direction, and the first direction being parallel to an extending direction of the fire-fighting pipeline.

For a battery according to an embodiment of the present application, a second limiting part is matched with a fourth limiting part to limit sliding of the second fixing member in a direction parallel to a fire-fighting pipeline, and thus the second fixing member is limited. In this way, a first limiting part and a third limiting part are matched with each other, and when the fire-fighting pipeline is fixed between the first fixing member and the second fixing member, it is possible to avoid the first fixing member and the second fixing member being staggered due to the sliding of the second fixing member in the direction parallel to the fire-fighting pipeline. In this way, even if a battery undergoes vibration, under the limiting of the second limiting part and the fourth limiting part, the sliding of the second fixing member in the direction parallel to the fire-fighting pipeline can be avoided. Thus the second fixing member is fitted with the first fixing member to fix the fire-fighting pipeline, which can avoid the fire-fighting pipeline detaching from the original installation position; and when the pressure relief mechanism is actuated, the fire-fighting pipeline can be damaged smoothly and accurately to lower the temperature of emissions discharged through the pressure relief mechanism in time, thereby improving the safety performance of the battery.

In some embodiments, the third limiting part includes a buckle extending in the first direction; the fourth limiting part is an opening disposed in the buckle; the first limiting part is a groove matched with the buckle; the second limiting part is a stopper matched with the opening, and when the buckle is buckled into the groove, the stopper is located within the opening to limit movement of the buckle in the first direction.

When the buckle is buckled into the groove, as long as the stopper is located within the opening of the buckle, a limit to the movement of the buckle in the first direction may be achieved, which is convenient for processing and assembly.

In some embodiments, a length of the stopper in a second direction is greater than a thickness of the buckle in the second direction, and the second direction is parallel to the first wall and perpendicular to the first direction.

A length of the stopper in a second direction is set to be greater than a thickness of the buckle in the second direction, and therefore this can avoid a case where the buckle shuns the stopper and slides in the first direction due to the smaller length of the stopper in the second direction when the buckle is buckled into the groove.

In some embodiments, the stopper has a first plane perpendicular to the first direction, and a side wall of the opening is matched with the first plane such that the stopper is located within the opening.

A first plane of the stopper is matched with a side wall of the opening such that the stopper is located within the opening, to limit the movement of the buckle in the first direction, which is convenient for processing and assembly.

In some embodiments, the stopper is a cuboid stopper, and the opening is a rectangular opening matched with the cuboid stopper.

The stopper is set as a cuboid stopper, and the opening is set as a rectangular opening, which have simple structures and are convenient for processing and assembly.

In some embodiments, the stopper is disposed at one end of the groove in the first direction, and/or the groove has two segments in the first direction, and the stopper is disposed in the middle of the two segments of the groove.

The stopper is disposed at one end of the groove, and/or the stopper is disposed in the middle of the two segments of the groove, and when the buckle is buckled into the groove, the stopper is located within an opening of the buckle, so that the sliding of the buckle in the first direction can be limited.

In some embodiments, the third limiting part includes a first buckle and a second buckle, the first buckle and the second buckle are separately disposed in the second direction, and the first limiting part includes a first groove and a second groove, the first groove and the second groove are separately disposed in the second direction, and are matched with the first buckle and the second buckle, respectively.

In this way, the first groove is matched with the first buckle and the second groove is matched with the second buckle, the fire-fighting pipeline is fixed between the first limiting part and the third limiting part, to avoid the fire-fighting pipeline deviating from the pressure relief mechanism in a direction perpendicular to the first wall during the use of the battery, thereby ensuring the relative position of the pressure relief mechanism and the fire-fighting pipeline and ensuring that the fire-fighting pipeline can be damaged accurately and timely when the pressure relief mechanism is actuated, so as to achieve the effect of cooling.

In some embodiments, the stopper corresponding to the first groove and the stopper corresponding to the second groove are axisymmetrically distributed with the first direction as an axis.

In this way, when the first buckle is buckled into the first groove and the second buckle is buckled into the second groove, openings of the first buckle and the second buckle have matched stoppers to limit the sliding of the first buckle in the first groove and the sliding of the second buckle in the second groove, and more effectively limit the sliding of the second fixing member in the first direction.

In some embodiments, the stopper corresponding to the first groove and the stopper corresponding to the second groove are symmetrically distributed about the center.

In this way, when the first limiting part and the third limiting part are installed and matched, if the installation direction is opposite to the original matching direction, the first limiting part cannot be matched and installed with the third limiting part, which can achieve a structurally foolproof effect.

In some embodiments, a number of the stoppers corresponding to the first groove differs from a number of the stoppers corresponding to the second groove.

In this way, when the first limiting part and the third limiting part are installed and matched, if the installation direction is opposite to the original matching direction, the first limiting part cannot be matched and installed with the third limiting part, which can achieve a structurally foolproof effect.

In some embodiments, the first fixing member is fixed to a surface of the first wall of the battery cell that is away from an interior of the battery cell.

In this way, when the fire-fighting pipeline is fixed between the first fixing member and the second fixing member, the fire-fighting pipeline is close to the pressure relief mechanism fixed to the first wall of the battery cell, which ensures that the fire-fighting pipeline can be accurately and timely damaged when the pressure relief mechanism is actuated to lower the temperature of emissions discharged through the pressure relief mechanism in time, thereby improving the safety performance of the battery.

In some embodiments, the first fixing member is fixed to a surface of a beam of a box that is close to the fire-fighting pipeline, the box being configured to accommodate the battery cell.

In this way, when the fire-fighting pipeline is fixed between the first fixing member and the second fixing member, the fire-fighting pipeline is close to the pressure relief mechanism fixed to the first wall of the battery cell, which ensures that the fire-fighting pipeline can be accurately and timely damaged when the pressure relief mechanism is actuated to lower the temperature of emissions discharged through the pressure relief mechanism in time, thereby improving the safety performance of the battery.

In some embodiments, the first fixing member is provided with a fixing part, and the fixing part is configured to fix the first fixing member to the beam. The first fixing member is fixed to the beam by the fixing member, so as to avoid shaking of the first fixing member in the box due to loose installation.

In some embodiments, the battery includes a plurality of battery cells arranged in the first direction, a plurality of first fixing members arranged in the first direction, and at least one second fixing member.

A plurality of first fixing members are provided to fix the fire-fighting pipeline, so that the fire-fighting pipeline is more stable.

In some embodiments, one second fixing member corresponds to the plurality of first fixing members. In this way, the number of the second fixing members can be reduced, thereby improving the processing and assembly efficiency of the second fixing members.

In a second aspect, a power consumption device is provided, including the battery according to the first aspect or any one of the embodiments of the first aspect, and the battery is configured to provide electrical energy.

In a third aspect, a method for producing a battery is provided, including: providing a battery cell, a first wall of the battery cell being provided with a pressure relief mechanism, and the pressure relief mechanism being configured to be actuated when an internal pressure or temperature of the battery cell reaches a threshold, to relieve the internal pressure; providing a fire-fighting pipeline, the fire-fighting pipeline being configured to accommodate a fire-fighting medium and the fire-fighting pipeline being configured to discharge the fire-fighting medium when the pressure relief mechanism is actuated; providing a first fixing member, the first fixing member being disposed on a side of the fire-fighting pipeline close to the first wall, the first fixing member being provided with a first limiting part and a second limiting part; and providing a second fixing member, the second fixing member being disposed on a side of the fire-fighting pipeline away from the first wall, the second fixing member being provided with a third limiting part and a fourth limiting part, the third limiting part and the first limiting part being matched with each other to fix the fire-fighting pipeline between the first fixing member and the second fixing member, the fourth limiting part and the second limiting part being matched with each other to limit the second fixing member in a first direction, and the first direction being parallel to an extending direction of the fire-fighting pipeline.

In a fourth aspect, a device for producing a battery is provided, including a module configured to execute the method provided in the foregoing third aspect.

In a technical solution of an embodiment of the present application, a second limiting part is matched with a fourth limiting part to limit sliding of the second fixing member in a direction parallel to a fire-fighting pipeline, and thus the second fixing member is limited. In this way, a first limiting part and a third limiting part are matched with each other, and when the fire-fighting pipeline is fixed between the first fixing member and the second fixing member, it is possible to avoid the first fixing member and the second fixing member being staggered due to the sliding of the second fixing member in the direction parallel to the fire-fighting pipeline. In this way, even if a battery undergoes vibration, under the limiting of the second limiting part and the fourth limiting part, the sliding of the second fixing member in the direction parallel to the fire-fighting pipeline can be avoided. Thus the second fixing member is fitted with the first fixing member to fix the fire-fighting pipeline, which can avoid the fire-fighting pipeline detaching from the original installation position; and when the pressure relief mechanism is actuated, the fire-fighting pipeline can be damaged smoothly and accurately to lower the temperature of emissions discharged through the pressure relief mechanism in time, thereby improving the safety performance of the battery.

BRIEF DESCRIPTION OF THE DRAWINGS

To describe technical solutions in embodiments of the present application more clearly, the following briefly introduces accompanying drawings required for describing the embodiments of the present application. Apparently, the accompanying drawings in the following description are only some embodiments of the present application, and a person of ordinary skill in the art may still derive other drawings from the accompanying drawings without creative efforts.

Figure 1:
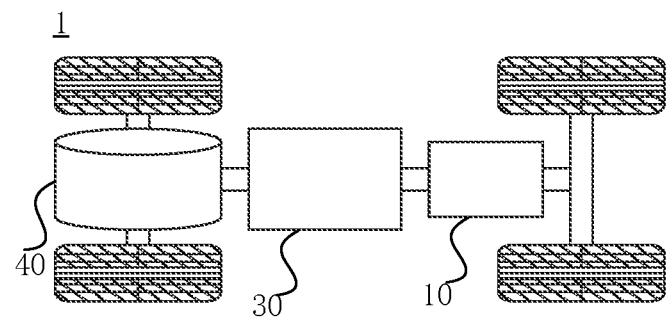
FIG. 1 is a schematic structural diagram of a vehicle disclosed in an embodiment of present application.

In the accompanying drawings, the drawings are not necessarily drawn to actual scale.

DESCRIPTION OF EMBODIMENTS

Embodiments of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that unless otherwise stated, the meaning of "a plurality of" means two or more, orientations or positional relationships indicated by terms such as "up", "down", "left", "right", "inside" and "outside" are merely for convenience of describing the present application and for simplifying the description, but not for indicating or implying that an indicated apparatus or element must have a specific orientation and/or must be constructed and operated in a specific orientation, which thus shall not be understood as limitation to the present application. In addition, the terms such as "first", "second", and "third" are merely intended for the purpose of description, and shall not be understood as an indication or implication of relative importance. "Vertical" is not strictly vertical, but within the allowable range of error. "Parallel" is not strictly parallel, but within an allowable range of error.

The terms representing directions in the following description are all directions shown in the drawings, which is not for limiting the specific structure of the present application. In the description of the present application, it should be noted that unless otherwise explicitly specified and limited, the terms "installation", "interconnection" and "connection" should be understood in a broad sense, for example, they may either be a fixed connection, a detachable connection, or an integrated connection; and they may either be a direct connection or an indirect connection through an intermediate medium. Those of ordinary skill in the art may understand the specific meanings of the foregoing terms in the present application according to a specific situation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In this disclosure, the phrases "at least one of A, B, and C" and "at least one of A, B, or C" both mean only A, only B, only C, or any combination of A, B, and C.

In the present application, a battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application. The battery cell may be cylindrical, flat, cuboid or in another shape, which is not limited by the embodiments of the present application. The battery cell is generally divided into three types according to the way of packaging: a cylindrical battery cell, a prismatic battery cell and a pouch battery cell, which is not limited by the embodiments of the present application.

The battery mentioned in the embodiments of the present application refers to a single physical module that includes one or more battery cells to provide a higher voltage and capacity. For example, the battery mentioned in the present application may include a battery module or a battery pack. The battery generally includes a box for enclosing one or more battery cells. The box can prevent liquid or other foreign matters from affecting the charging or discharging of the battery cell.

The battery cell includes an electrode assembly and an electrolyte, and the electrode assembly is composed of a positive electrode sheet, a negative electrode sheet and a separator. The operation of the battery cell mainly relies on movement of metal ions between the positive electrode sheet and the negative electrode sheet. The positive electrode sheet includes a positive electrode current collector and a positive active material layer. The positive active material layer is coated on a surface of the positive electrode current collector, and the positive electrode current collector not coated with the positive active material layer protrudes from the positive electrode current collector coated with the positive active material layer and is used as a positive electrode tab. A lithium-ion battery is taken as an example, the material of the positive electrode current collector may be aluminum, and the positive electrode active material may be lithium cobalt oxides, lithium iron phosphate, ternary lithium or lithium manganate, or the like. The negative electrode sheet includes a negative electrode current collector and a negative active material layer. The negative active material layer is coated on a surface of the negative electrode current collector, and the negative current collector not coated with the negative active material layer protrudes from the negative current collector coated with the negative active material layer and is used as a negative electrode tab. The material of the negative electrode current collector may be copper, and the negative electrode active material may be carbon or silicon, and like. In order to ensure that a large current is passed without fusing, positive electrode tabs are multiple in number and stacked together, and negative electrode tabs are multiple in number and stacked together. A material of the separator may be polypropylene (PP), polyethylene (PE), or the like. In addition, the electrode assembly may be a winding structure or a laminated structure, and the embodiments of the present application are not limited thereto.

With the development of the battery technology, it is needed to consider many design factors, such as energy density, cycle life, discharge capacity, C-rate and other performance parameters. In addition, the safety of the battery should also be considered.

With respect to the battery cell, the main safety hazards come from the charging and discharging processes, and a suitable environmental temperature design is also required. In order to effectively avoid unnecessary losses, multiple protection measures are generally taken for the battery cell. Specifically, the protection measures include at least one or more of a switching element, a properly selected separator material and a pressure relief mechanism. The switching element refers to an element that may stop the charging or discharging of a battery when the temperature or resistance in a battery cell reaches a certain threshold. The separator is configured to isolate the positive electrode sheet from the negative electrode sheet and can automatically dissolve micron-sized (or even nanoscale) micropores attached to the separator when the temperature rises to a certain value, thus preventing metal ions from passing through the separator and terminating the internal reaction of the battery cell. The pressure relief mechanism refers to an element or component that is actuated when an internal pressure or temperature of the battery cell reaches a predetermined threshold to relieve the internal pressure or temperature.

The pressure relief mechanism on the battery cell has an important influence on the safety of the battery. For example, when short circuit, overcharge and other phenomena occur, it may lead to thermal runaway inside the battery cell, resulting in a sudden increase in pressure or temperature. In this case, the internal pressure and temperature can be relieved outward through the actuation of the pressure relief mechanism, to prevent the battery cell from exploding and catching fire.

As for the design of the pressure relief mechanism, the main concern is to relieve the high pressure and high heat inside the battery cell, that is, to discharge the emissions to the outside of the battery cell. The high-temperature and high-pressure emissions are discharged along a direction of the pressure relief mechanism provided in the battery cell, and more specifically, may be discharged along a direction of a region where the pressure relief mechanism is actuated. The strength and destructive power of such emissions may be great, or may even be enough to break through one or more structures along this direction, causing further safety problems.

In view of this, a fire-fighting pipeline can be provided at a corresponding position of the pressure relief mechanism of the battery cell, and emissions discharged from the battery cell when the pressure relief mechanism is actuated are used to pass through and damage the fire-fighting pipeline, so that the fire-fighting medium in the fire-fighting pipeline is discharged from a damaged position of the fire-fighting pipeline, to cool and lower a temperature of the emissions discharged from the pressure relief mechanism, thereby reducing the risk resulting from the emissions and enhancing the safety of the battery.

In order to ensure that the fire-fighting pipeline can be damaged when the pressure relief mechanism is actuated, to lower the temperature of the emissions discharged by the pressure relief mechanism in time, a position of the fire-fighting pipeline should correspond to a position of the pressure relief mechanism. However, during the actual use of the battery, the battery may undergo vibration, and thus how to install and fix the fire-fighting pipeline in the box of the battery is an extremely important issue.

Therefore, according to an embodiment of the present application, a battery is provided, including a plurality of battery cells and a fire-fighting pipeline, a pressure relief mechanism is provided on a first wall of the battery cell, and the battery also includes a first fixing member and a second fixing member. The first fixing member is disposed on a side of the fire-fighting pipeline close to the first wall, and the second fixing member is disposed on a side of the fire-fighting pipeline away from the first wall, and the first fixing member is provided with a first limiting part and a second limiting part, and the second fixing member is provided with a third limiting part and a fourth limiting part. The third limiting part and the first limiting part are matched with each other to fix the fire-fighting pipeline between the first fixing member and the second fixing member, and the fourth limiting part and the second limiting part are matched with each other to limit the second fixing member in a direction parallel to an extending direction of the fire-fighting pipeline. That is, the second limiting part is matched with the fourth limiting part to limit the second fixing member. In this way, the first limiting part and the third limiting part are matched with each other, and when the fire-fighting pipeline is fixed between the first fixing member and the second fixing member, it is possible to avoid the first fixing member and the second fixing member being staggered due to the sliding of the second fixing member in the direction parallel to the fire-fighting pipeline. In this way, even if a battery undergoes vibration, under the limiting of the second limiting part and the fourth limiting part, the sliding of the second fixing member in the direction parallel to the fire-fighting pipeline can be avoided. Thus the second fixing member is fitted with the first fixing member to fix the fire-fighting pipeline, which can avoid the fire-fighting pipeline detaching from the original installation position; and when the pressure relief mechanism is actuated, the fire-fighting pipeline can be damaged smoothly and accurately to lower the temperature of emissions discharged through the pressure relief mechanism in time, thereby improving the safety performance of the battery.

The technical solutions described in the embodiments of the present application are applicable to various power consumption devices using batteries. The power consumption device may be a vehicle, a cell phone, a portable device, a notebook computer, a ship, a spacecraft, an electric toy, an electric tool, or the like. The vehicle may be a fuel vehicle, a gas vehicle or a new energy vehicle; the new energy vehicle may be a pure electric vehicle, a hybrid vehicle or an extended range vehicle, etc.; the spacecraft include an airplane, a rocket, a space shuttle and a spaceship, etc.; the electric toy includes a fixed or mobile electric toy, such as a game console, an electric vehicle toy, an electric ship toy and an electric airplane toy, etc.; the electric tool includes a metal cutting power tool, a grinding power tool, an assembly power tool and a railway power tool, such as an electric drill, an electric grinder, an electric wrench, an electric screwdriver, an electric hammer, an impact drill, a concrete vibrator, and an electric planer, etc. The embodiment of the present application does not impose special restrictions on the above power consumption devices.

For the convenience of description, the following embodiments take a vehicle as an example of the power consumption device for description.

For example, as shown in FIG. 1, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 may be used not only as an operating power source for the vehicle 1 but also as a driving power source for the vehicle 1, replacing or partially replacing fuel or natural gas to provide driving power for the vehicle 1.

In order to meet different power requirements, the battery may include a plurality of battery cells, where the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form battery modules, and then the multiple battery modules are connected in series, in parallel or in series and parallel to form a battery. That is, a plurality of battery cells may directly form a battery, or may first form battery modules, and then the battery modules form a battery.

Figure 2:
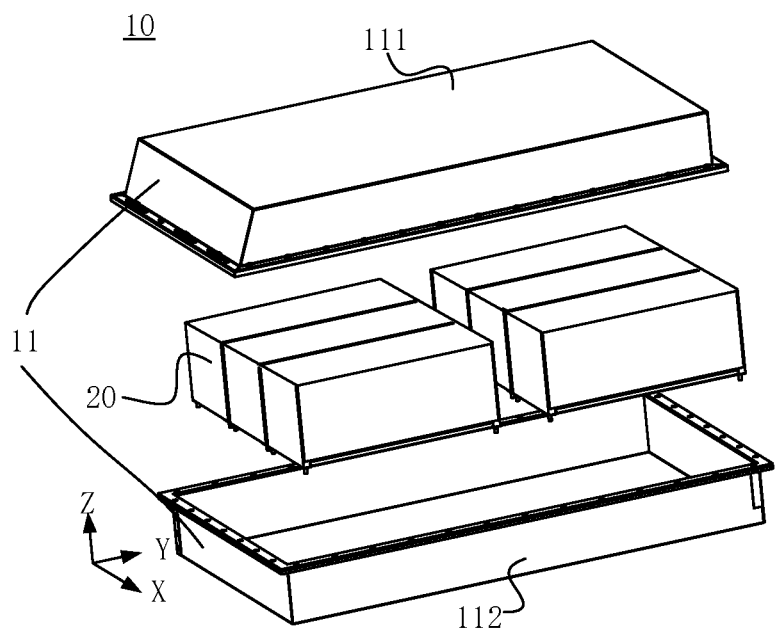
FIG. 2 is an exploded schematic structural diagram of a battery disclosed in an embodiment of the present application.

For example, FIG. 2 shows an exploded schematic structural diagram of a battery 10 according to an embodiment of the present application. The battery 10 may include a plurality of battery cells 20 arranged in an array. The battery 10 may further include a box 11 with the interior thereof being a hollow structure, the plurality of battery cells 10 are accommodated in the box 11, and the shape of the box 11 may be determined according to the plurality of battery cells 20 accommodated therein. In some embodiments, the box may be a cuboid with six walls. FIG. 2 shows a possible implementation of a box 11 of the embodiment of the present application. As shown in FIG. 2, the box may include two portions, which are referred to as a first portion 111 and a second portion 112, respectively, and the first portion 111 and the second portion 112 are fastened together. The shapes of the first portion 111 and the second portion 112 may be determined according to the shape of the battery cell 20, and at least one of the first portion 111 and the second portion 112 has an opening. For example, as shown in FIG. 2, the first portion 111 and the second portion 112 each may be a hollow cuboid and each have only one surface as an opening face, an opening of the first portion 111 is arranged opposite to an opening of the second portion 112, and the first portion 111 and the second portion 112 are fastened to each other to form the box 11 with a closed chamber.

For another example, different from that shown in FIG. 2, only one of the first portion 111 and the second portion 112 may be a hollow cuboid with an opening, while the other may be a plate shape, so as to cover the opening. For example, in an example that the second portion 112 is a hollow cuboid and has only one face as an opening face and the first portion 111 is in a plate shape, an opening of the second portion 112 is covered by the first portion 111 to form the box 11 with a closed chamber, and the chamber may be configured to accommodate the plurality of battery cells 20. The plurality of battery cells 20 are combined in parallel connection or series connection or series-parallel connection and are then placed in the box 11 formed by fastening the first portion 111 to the second portion 112.

Optionally, the battery 10 may also include other structures, which will not be described in detail herein. For example, the battery 10 may also include a bus component. The bus component is configured to implement an electrical connection between the plurality of battery cells 20, such as parallel connection, series connection or series-parallel connection. Specifically, the bus component may implement an electrical connection between the battery cells 20 by connecting electrode terminals of the battery cells 20. Further, the bus component may be fixed to the electrode terminals of the battery cells 20 by means of welding. Electric energy of the plurality of battery cells 20 may be further led out through an electrically conductive mechanism passing through the box 11.

According to different power requirements, the number of the battery cells 20 in the battery 10 may be set to any value. The plurality of battery cells 20 may be connected in series or in parallel or in series and parallel to implement larger capacity or power. Since the number of battery cells 20 included in each battery 10 may be large, the battery cells 20 may be provided in groups for convenience of installation, and each group of battery cells 20 constitutes a battery module. The number of the battery cells 20 included in the battery module is not limited and may be set as required. The battery may include a plurality of battery modules, and these battery modules may be connected in series, in parallel or in series and parallel.

Figure 3:
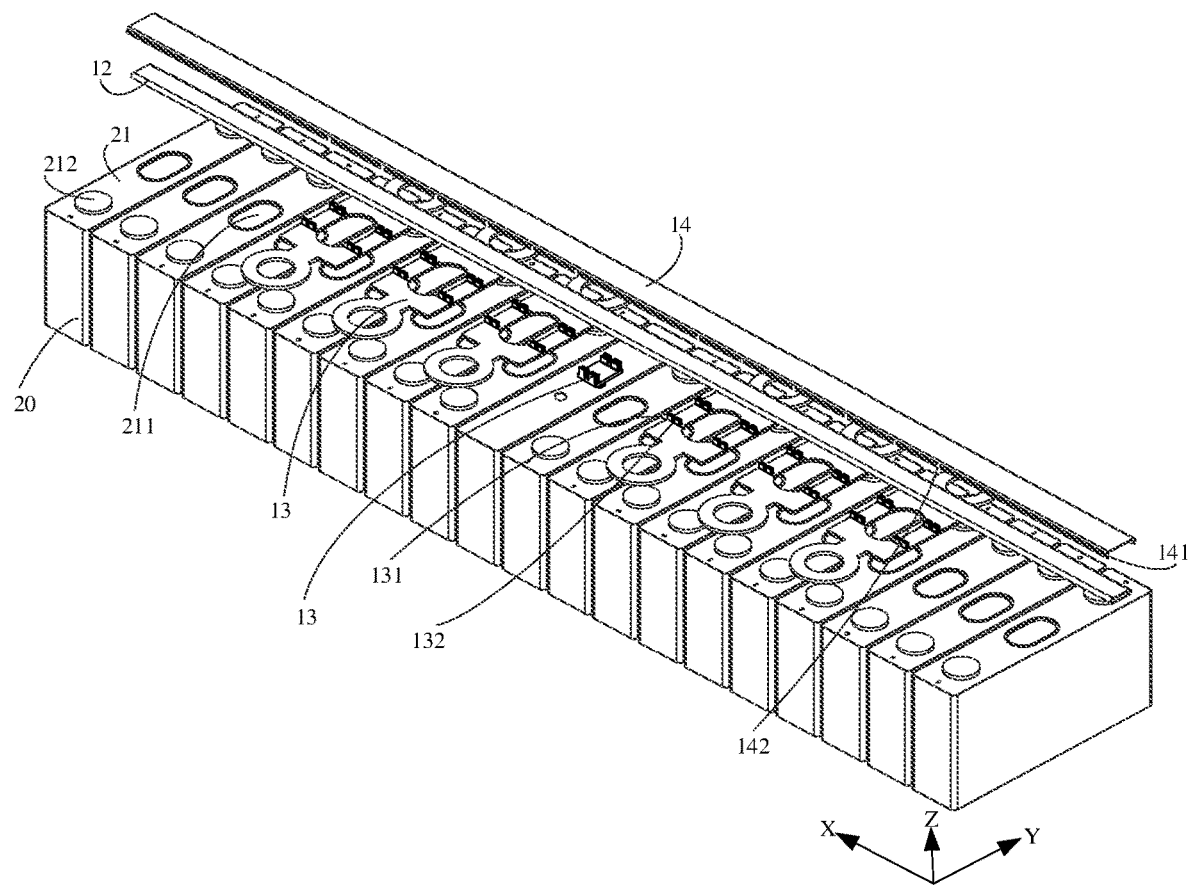
FIG. 3 is a partially exploded schematic structural diagram of a battery disclosed in an embodiment of the present application.
Figure 4:
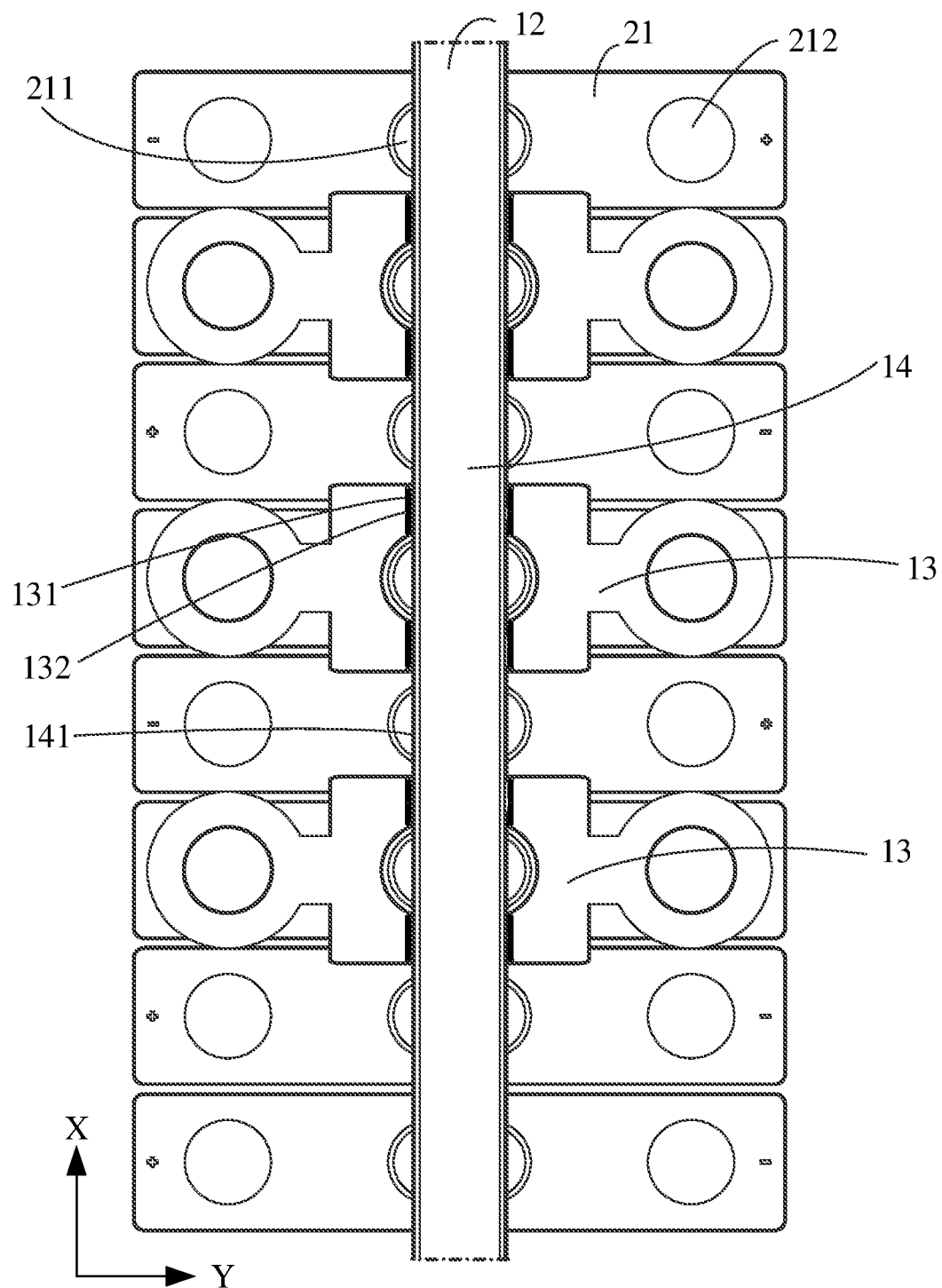
FIG. 4 is a schematic partial top view of a battery disclosed in an embodiment of the present application.

FIG. 3 shows a partially exploded schematic structural diagram of a battery 10 according to an embodiment of the present application, and FIG. 4 shows a partial schematic top view of the battery 10 corresponding to FIG. 3. As shown in FIG. 3 and FIG. 4, the battery 10 of the embodiment of the present application includes a battery cell 20, a fire-fighting pipeline 12, a first fixing member 13, and a second fixing member 14. Specifically, a first wall 21 of the battery cell 20 is provided with a pressure relief mechanism 211, and the pressure relief mechanism 211 is configured to be actuated when an internal pressure or temperature of the battery cell 20 reaches a threshold, to relieve the internal pressure. The fire-fighting pipeline 12 is configured to accommodate a fire-fighting medium and the fire-fighting pipeline 12 is configured to discharge the fire-fighting medium when the pressure relief mechanism 211 is actuated. The first fixing member 13 is fixed on a side of the fire-fighting pipeline 12 close to the first wall 21, the first fixing member 13 is provided with a first limiting part 131 and a second limiting part 132. The second fixing member 14 is fixed on a side of the fire-fighting pipeline 12 away from the first wall 21, the second fixing member 14 is provided with a third limiting part 141 and a fourth limiting part 142, the third limiting part 141 and the first limiting part 131 are matched with each other to fix the fire-fighting pipeline 12 between the first fixing member the member 13 and the second fixing member 14, the fourth limiting part 142 and the second limiting part 132 are matched with each other to limit the second fixing member 14 in a first direction, and the first direction is parallel to an extending direction of the fire-fighting pipeline 12, for example, the X direction as shown in FIG. 3.

The battery cell 20 in the embodiment of the present application may be a hollow polyhedron structure, and the first wall 21 may be any wall of the battery cell 20. For example, as shown in FIG. 3 and FIG. 4, in the present application, that the first wall 21 is a wall with the smallest area of the battery cell 20 is used as an example, but the embodiment of the present application is not limited thereto.

In an embodiment of the present application, a pressure relief mechanism 211 is provided on the first wall 21, and the pressure relief mechanism 211 can be actuated when an internal pressure or temperature of the battery cell 20 reaches a threshold, to relieve the internal pressure and lower the internal temperature. Therefore, the first wall 21 is generally not provided on a wall where two battery cells 20 are attached to each other. For example, as shown in FIG. 3 and FIG. 4, two adjacent battery cells 20 may be attached to each other through a wall with the largest area, and therefore the first wall 21 provided with the pressure relief mechanism 211 is not the wall with the largest area. On the contrary, if the two adjacent battery cells 20 are attached through other walls, the first wall 21 provided with the pressure relief mechanism 211 may be set as the wall with the largest area.

It should be understood that the pressure relief mechanism 211 in the embodiment of the present application is configured to be actuated when the internal temperature or pressure of the battery cell 20 reaches a threshold, and the threshold may be set as different values according to different requirements of practical applications. For example, the threshold may depend on the material of one or more of the positive electrode sheet, the negative electrode sheet, the electrolyte and the separator in the battery cell 20. In addition, the pressure relief mechanism 211 may take the form of an anti-explosion valve, an air valve, a pressure relief valve or a safety valve, etc., and may specifically adopt a pressure-sensitive or temperature-sensitive element or structure. That is, when the internal pressure or temperature of the battery cell 20 reaches a predetermined threshold, the pressure relief mechanism 211 performs an action or a weakened structure provided in the pressure relief mechanism 211 is damaged, so as to form an opening or channel for relieving the internal pressure or temperature.

The "actuation" mentioned in the present application means that the pressure relief mechanism 211 acts or is activated to a certain state, such that the internal pressure and temperature of the battery cell 20 can be relieved. The action generated by the pressure relief mechanism 211 may include but is not limited to: at least a portion of the pressure relief mechanism 211 being fractured, broken, torn or opened, etc. When the pressure relief mechanism 211 is actuated, high-temperature and high-pressure substances inside the battery cell 20 are discharged outwards from an actuated position as emissions. In this way, the pressure of the battery cell 20 can be relieved under controllable pressure or temperature, thereby avoiding potentially more serious accidents.

The emissions from the battery cell 20 mentioned in the present application include but are not limited to: an electrolyte, dissolved or split positive and negative electrode sheets, fragments of a separator, high-temperature and high-pressure gas generated by reaction, flame, etc.

The fire-fighting pipeline 12 in an embodiment of the present application is configured to accommodate a fire-fighting medium, the fire-fighting medium here may be a fluid, and the fluid may be a liquid or gas. The fire-fighting pipeline 12 can discharge the fire-fighting medium when the pressure relief mechanism 211 is actuated. For example, the fire-fighting pipeline 12 may be disposed corresponding to the pressure relief mechanism 211, so that when the pressure relief mechanism 211 is actuated, the fire-fighting pipeline 12 can be damaged and the fire-fighting medium inside it flows out, which can lower the temperature of the emissions discharged from the pressure relief mechanism 211, to avoid thermal diffusion of the battery cell 20 in which thermal runaway occurs and improve the safety of the battery 10.

In addition, in the case where the pressure relief mechanism 211 does not damage the fire-fighting pipeline 12, the fire-fighting pipeline 12 may not accommodate any substance, but in the case where the pressure relief mechanism 211 is actuated, the fire-fighting medium 12 may be accommodated in the fire-fighting pipeline, for example, the fire-fighting medium may be controlled to enter the fire-fighting pipeline 12 by switching on and off a valve. Alternatively, in the case where the pressure relief mechanism 211 is not damaged, the fire-fighting medium 12 may always be accommodated in the fire-fighting pipeline, and the fire-fighting medium may also be configured to adjust the temperature of the battery cell 20. Temperature adjustment means heating or cooling a plurality of battery cells 20. In the case of cooling or lowering the temperature of the battery cells 20, the fire-fighting pipeline 12 is configured to accommodate a cooling fluid to lower the temperature of the plurality of battery cells 20. In this case, the fire-fighting pipeline 12 may also be called a cooling component, a cooling system or a cooling pipeline, etc. The fire-fighting medium accommodated by the fire-fighting pipeline may also be called a cooling medium or a cooling fluid, and more specifically, may be called a cooling liquid or a cooling gas. Optionally, the fire-fighting medium may flow in a circulating manner to achieve better temperature adjustment effects.

Optionally, the fire-fighting medium may be water, a mixture of water and ethylene glycol, or air, etc.

It should be understood that the battery cells 20, the fire-fighting pipeline 12, the first fixing member 13, and the second fixing member 14 shown in FIG. 3 and FIG. 4 may be disposed in the battery 10, for example, disposed in the box 11 of the battery 10. Moreover, the box 11 of the battery 10 in the embodiment of the present application may also be configured to accommodate other components. For example, the box 11 may also be provided with a structure configured to fix the battery cells 20. For another example, the box 11 may also configured to accommodate a bus component. The bus component may be configured to implement an electrical connection between the plurality of battery cells 20, such as parallel connection, series connection or series-parallel connection. The bus component may implement an electrical connection between the battery cells by connecting electrode terminals 212 of the battery cells 20. In some embodiments, the bus component may be fixed to the electrode terminal 212 of the battery cell 20 by means of welding.

It should be understood that each battery cell 20 in the embodiment of the present application may include two electrode terminals 212, and the two electrode terminals 212 may be disposed on any one or more walls of the battery cell 20. For example, two electrode terminals 212 may be disposed on the same wall, or on two walls respectively. For any electrode terminal 212, it can be disposed on the same wall or different walls as the pressure relief mechanism 211. As shown in FIG. 3 and FIG. 4, in the embodiment of the present application, that two electrode terminals 212 are disposed on the first wall 21 is taken as an example for illustration.

Specifically, the first wall 21 is generally in a shape of a flat plate, two electrode terminals 212 of the same battery cell 20 are fixed on a flat surface, and the two electrode terminals 212 are a positive electrode terminal and a negative electrode terminal, respectively. Each electrode terminal 212 is correspondingly provided with a connecting member also called a current collector, which is located between the first wall 21 and the electrode assembly inside the battery cell 20 and configured to electrically connect the electrode assembly to the electrode terminal 212. For example, one or more electrode assemblies may be disposed at an interior of the battery cell 20, and each electrode assembly has two electrode tabs with opposite polarities. For example, when a first electrode tab of the two electrode tabs is a positive electrode tab, a second electrode tab of the two electrode tabs is a negative electrode tab. The first electrode tab of one or more electrode assemblies is connected to an electrode terminal 212 through a connecting member, for example, connected to a positive electrode terminal; and the second electrode tab of one or more electrode assemblies is connected to another electrode terminal through another connecting member, for example, connected to the negative electrode terminal.

The first fixing member 13 of the embodiment of the present application is provided with a first limiting part 131 and a second limiting part 132, and the second fixing member 14 is provided with a third limiting part 141 and a fourth limiting part 142. The first limiting part 131 and the third limiting part 141 can be matched with each other, for example, the first limiting part 131 and the third limiting part 141 can be fastened to each other by setting a groove structure and a buckle structure, so that the first fixing member 13 and the second fixing member 14 are relatively fixed in a direction perpendicular to the first wall 21. Further, the fire-fighting pipeline 12 may also be fixed between the first fixing member 13 and the second fixing member 14, so as to constrain and limit the movement of the fire-fighting pipeline 12 in the direction perpendicular to the first wall 21, thereby fixing the fire-fighting pipeline 12. The second limiting part 132 and the fourth limiting part 142 can be matched with each other, for example, the second limiting part 132 and the fourth limiting part 142 can be inserted into each other by setting a stopper structure and an opening structure to limit the sliding of the second fixing member 14 in the first direction X, so that the second fixing member 14 and the first fixing member 13 are relatively fixed in the first direction X, thereby effectively fixing the fire-fighting pipeline 12, which can avoid the fire-fighting pipeline 12 deviating from or away from the corresponding position of the pressure relief mechanism 211. Further, when the pressure relief mechanism 211 is actuated, the fire-fighting pipeline can be damaged smoothly and accurately 12 to lower the temperature of the emissions discharged through the pressure relief mechanism 211 in time, thereby improving the safety performance of the battery 10.

The first limiting part 131, the second limiting part 132, the third limiting part 141, and the fourth limiting part 142 of the embodiment of the present application will be described in detail below with reference to the accompanying drawings. The following is taken as an example for description: the first limiting part 131 is a groove structure, the second limiting part 132 is a stopper structure, the third limiting part 141 is a buckle structure, and the fourth limiting part 142 is an opening structure.

Figure 5:
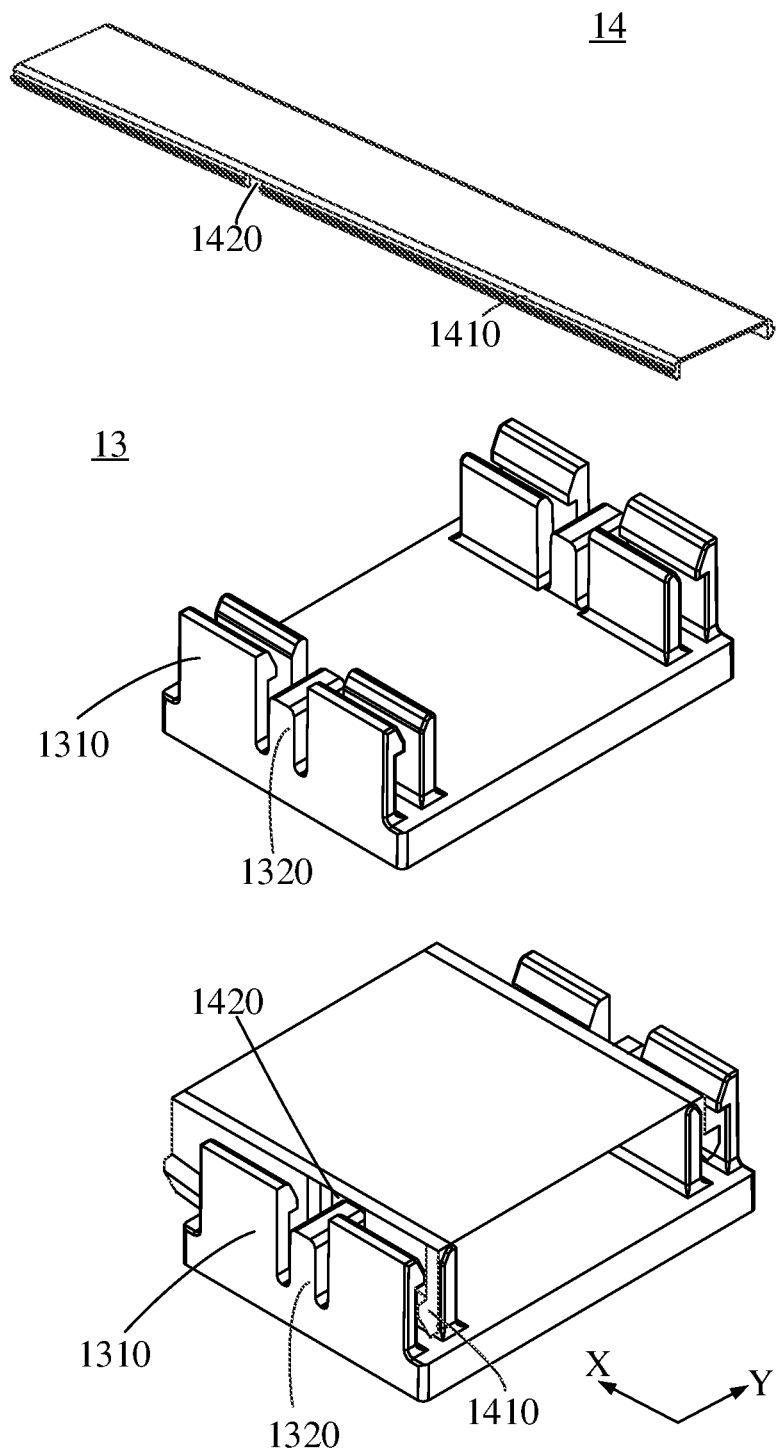
FIG. 5 is a schematic structural diagram of a first fixing member and a second fixing member disclosed in an embodiment of the present application.

Specifically, as shown in FIG. 5, the third limiting part 141 is a buckle 1410 extending in the first direction X; the fourth limiting part 142 is an opening 1420 disposed in the buckle 1410; the first limiting part 131 is a groove 1310 matched with the buckle 1410; the second limiting part is a stopper 1320 matched with the opening 1420, and when the buckle 1410 is buckled into the groove 1310, the stopper 1320 is located within the opening 1420 to limit movement of the buckle 1410 in the first direction X. Such structure arrangement is convenient for processing and assembling.

In an embodiment of the present application, a length of the stopper 1320 in a second direction is greater than a thickness of the buckle 1410 in the second direction, and the second direction, for example, the direction Y as shown in FIG. 5, is parallel to the first wall 21 and perpendicular to the first direction X. This can avoid a case where the buckle 1410 shuns the stopper 1320 and slides in the first direction X due to the smaller length of the stopper 1320 in the second direction Y when the buckle 1410 is buckled into the groove 1310.

In an embodiment of the present application, the stopper 1320 has a first plane perpendicular to the first direction, and a side wall of the opening 1420 is matched with the first plane such that the stopper 1320 is located within the opening 1420. The first plane of the stopper 1320 is matched with the side wall of the opening such that the stopper 1320 is located within the opening 1420, to limit the movement of the buckle 1410 in the first direction X, which is convenient for processing and assembly.

Specifically, as shown in FIG. 5, the stopper 1320 is a cuboid stopper, and the opening 1420 is a rectangular opening matched with the cuboid stopper. It should be understood that the stopper 1320 may also be set as other shapes that have a first plane perpendicular to the first direction. Correspondingly, the opening 1420 can be set as other shapes matched with the stopper 1320, which is not limited in the present application.

The stopper 1320 is set as a cuboid stopper, and the opening 1420 is set as a rectangular opening, which have simple structures and are convenient for processing and assembly.

Figure 6:
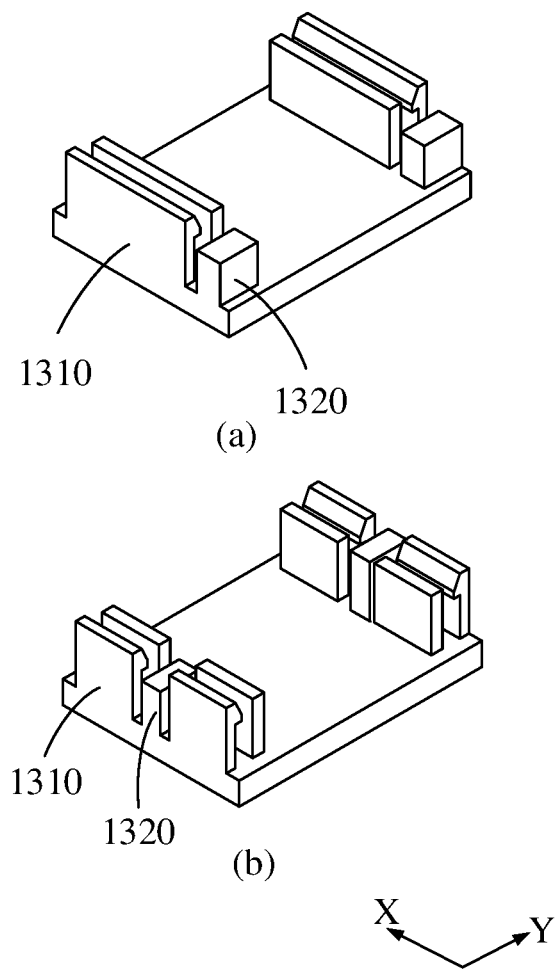
FIG. 6 is a schematic structural diagram of a first fixing member disclosed in an embodiment of the present application.

In an embodiment of the present application, as shown in FIG. 6(*a*), in a first direction X, a stopper 1320 is disposed at one end of a groove 1310. In addition, as shown in FIG. 6(*b*), a groove 1310 is set to be two segments in the first direction, and the stopper 1320 is disposed in the middle of the two segments of the groove 1310. Whether the stopper 1320 is disposed at one end of the groove 1310, or the stopper 1320 is disposed in the middle of the two segments of the groove 1310, when the buckle 1410 is buckled into the groove 1310, the stopper 1320 is located within the opening of the buckle 1410, all of which can limit the sliding of the buckle 1410 in the first direction X.

Figure 7:
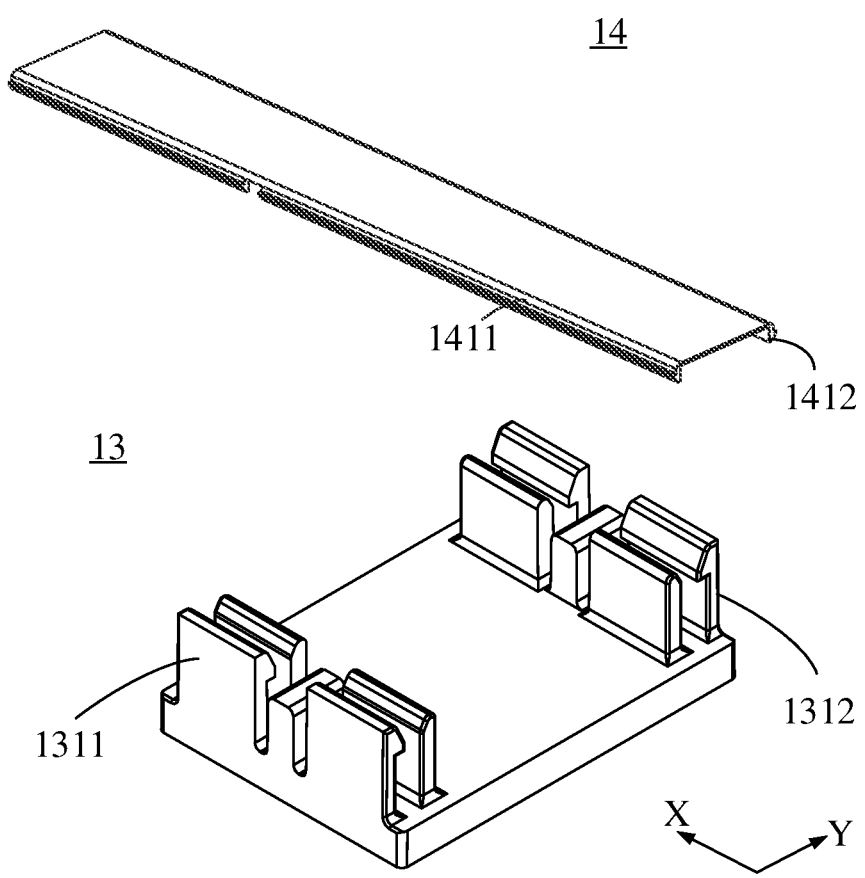
FIG. 7 is a schematic structural diagram of another first fixing member and second fixing member disclosed in an embodiment of the present application.

In an embodiment of the present application, as shown in FIG. 7, the third limiting part 141 includes a first buckle 1411 and a second buckle 1412, and the first buckle 1411 and the second buckle 1412 are separately disposed in the second direction Y. The first limiting part includes a first groove 1311 and a second groove 1312, the first groove 1311 and the second groove 1312 are separately disposed in the second direction Y. The first groove 1311 is matched with the first buckle 1411, the second groove 1312 is matched with the second buckle 1412, so that the fire-fighting pipeline 12 may be fixed between the first limiting part 131 and the third limiting part 141 to avoid the fire-fighting pipeline 12 deviating from the pressure relief mechanism 211 in a direction perpendicular to the first wall 21 during the use of the battery 10, thereby ensuring the relative position of the pressure relief mechanism 211 and the fire-fighting pipeline 12 and ensuring that the fire-fighting pipeline 12 can be damaged accurately and timely when the pressure relief mechanism 211 is actuated, so as to achieve the effect of cooling.

Figure 8:
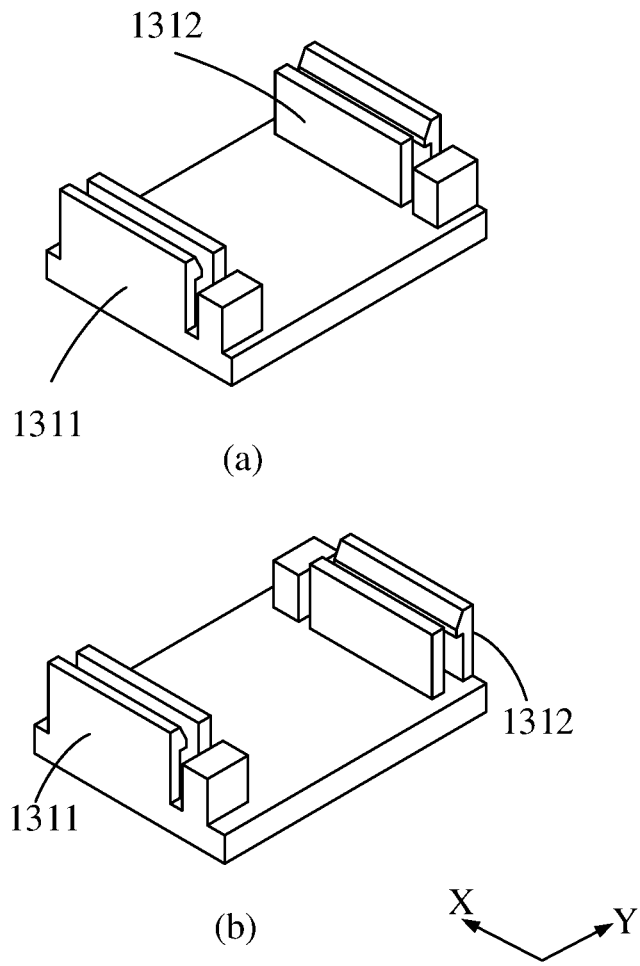
FIG. 8 is a schematic structural diagram of another first fixing member disclosed in an embodiment of the present application.

In an embodiment of the present application, a stopper 1320 corresponding to the first groove 1311 and a stopper 1320 corresponding to the second groove 1312 are axisymmetrically distributed with the first direction as the axis, for example, the distribution manner as shown in FIG. 8(*a*).

"A stopper 1320 corresponding to the first groove 1311" mentioned in the present application refers to stoppers 1320 located on the same side of the first groove 1311 and arranged in a row with the first groove 1311 in the first direction X, that is, the stoppers 1320 disposed at one end of the first groove 1311 or the stoppers 1320 disposed in the middle of two segments of the first groove 1311. "A stopper 1320 corresponding to the second groove 1312" refers to stoppers 1320 located on the same side of the second groove 1312, and arranged in a row with the second groove 1312 in the first direction X, that is, the stoppers 1320 disposed at one end of the second groove 1312 or the stoppers 1320 disposed in the middle of two segments of the second groove 1312.

In this way, when the first buckle 1411 is buckled into the first groove 1311 and the second buckle 1412 is buckled into the second groove 1312, openings of the first buckle 1411 and the second buckle 1411 have matched stoppers to limit the sliding of the first buckle 1411 in the first groove 1311 and the sliding of the second buckle 1412 in the second groove 1312, and more effectively limit the sliding of the second fixing member 14 in the first direction X.

In an embodiment of the present application, a stopper 1320 corresponding to the first groove 1311 and a stopper 1320 corresponding to the second groove 1312 are symmetrically distributed about the center, for example, the distribution manner as shown in FIG. 8(*b*). In this way, when the first limiting part 131 and the third limiting part 141 are installed and matched, if the installation direction is opposite to the original matching direction, the first limiting part 131 cannot be matched and installed with the third limiting part 141, which can achieve a structurally fool-proof effect.

Figure 9:
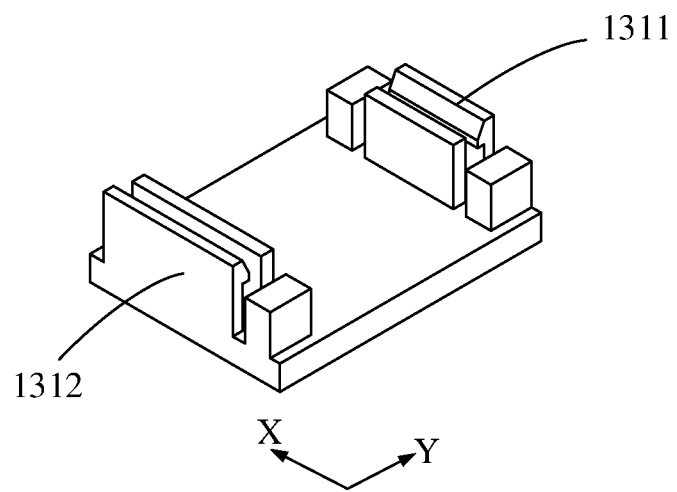
FIG. 9 is a schematic structural diagram of yet another first fixing member disclosed in an embodiment of the present application.

In an embodiment of the present application, a number of the stoppers 1320 corresponding to the first groove 1311 differs from a number of the stoppers 1320 corresponding to the second groove 1312. For example, one end of the first groove 1311 may be provided with one stopper 1320 correspondingly, and one end of the second groove 1312 may not be provided with a stopper 1320; alternatively, both ends of the first groove 1311 each may be provided with one stopper 1320, and one end of the second groove 1312 may be provided with one stopper 1320 correspondingly; as shown in FIG. 9, both ends of the first groove 1311 each may be provided with one stopper 1320, and one end of the second groove 1312 is correspondingly provided with one stopper 1320.

In this way, when the first limiting part 131 and the third limiting part 141 are installed and matched, if the installation direction is opposite to the original matching direction, the first limiting part 131 cannot be matched and installed with the third limiting part 141, which can achieve a structurally fool-proof effect.

Figure 10:
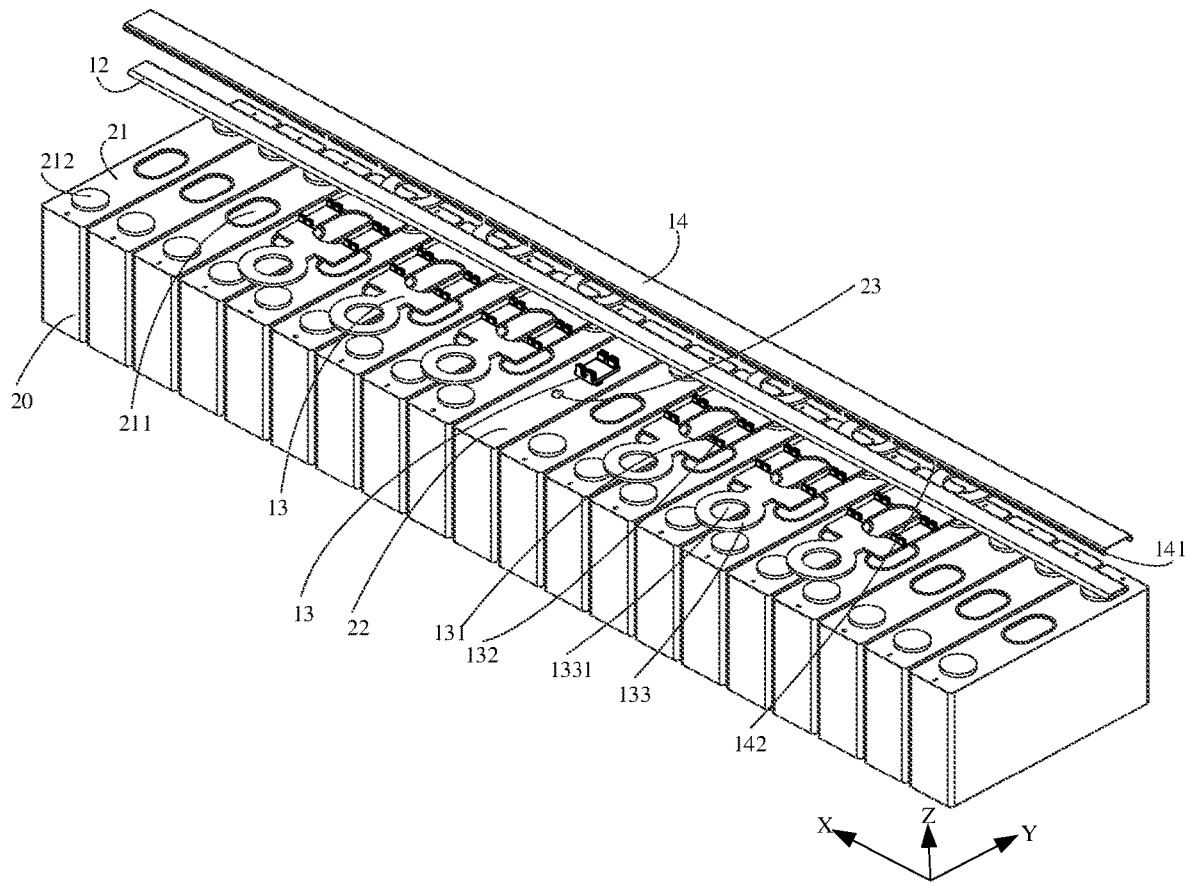
FIG. 10 is a partially exploded schematic structural diagram of another battery disclosed in an embodiment of the present application.

In an embodiment of the present application, the first fixing member 13 is provided with an accommodating part 133 configured to accommodate an electrode terminal 212. Specifically, the first fixing member 13 is disposed on a surface of the first wall 21 away from an interior of the battery cell 20, and when the first wall 21 is provided with the electrode terminals 212, the accommodating part 133 may be provided to shun the electrode terminal 212. As shown in FIG. 10, the accommodating part 133 may include a through hole 1331, so that the electrode terminal 212 can pass through the through hole 1331, and the accommodating part 133 surrounds the electrode terminal 212. In this way, a surface of one end of the electrode terminal 212 away from the battery cell 20 is exposed, and the bus component may be connected to the electrode terminals 212 of the plurality of battery cells 20 by means of welding or the like, thereby achieving the electrical connection of the plurality of battery cells 20, and the first fixing member 13 may also be relatively fixed to the battery cell 20 through the accommodating part 133.

Optionally, as shown in FIG. 10, each electrode terminal 212 is generally cylindrical, and correspondingly, the through hole 1331 of the accommodating part 133 may also be set as a circular through hole to accommodate the electrode terminal 212.

In an embodiment of the present application, the box 11 may also be provided with a beam 22 configured to fix the battery cells 20, and the beam 22 is configured to attach to at least one battery cell 20 among the plurality of battery cells 20 to fix the plurality of battery cells 20.

The embodiment of the present application does not make any limitation on the arrangement manner of the beam 22 in the box 11. In one example, one side of the beam 22 is attached to a side wall of the box 11, and the other side of the beam 22 is attached to the battery cell 20, and in this case, the beam 22 may also be regarded as part of the side wall of the box 11. In another example, both sides of the beam 22 are respectively attached to the battery cells 20, and in this case, the beam 22 may be regarded as an auxiliary structural member for improving installation stability of the plurality of battery cells 20 in the box 11, where the beam 22 may also be called a cross beam.

In the box 11, according to actual usage requirements, the number of beams 22 may be flexibly set, for example, 1, 2, 3, or other numbers. When the number of beams 22 is multiple, the plurality of beams 22 may be all the side walls of the box 11, may be all cross beams, or may be partly the side walls of the box 11 and partly be the cross beams, and the present application is not limited to this.

Figure 11:
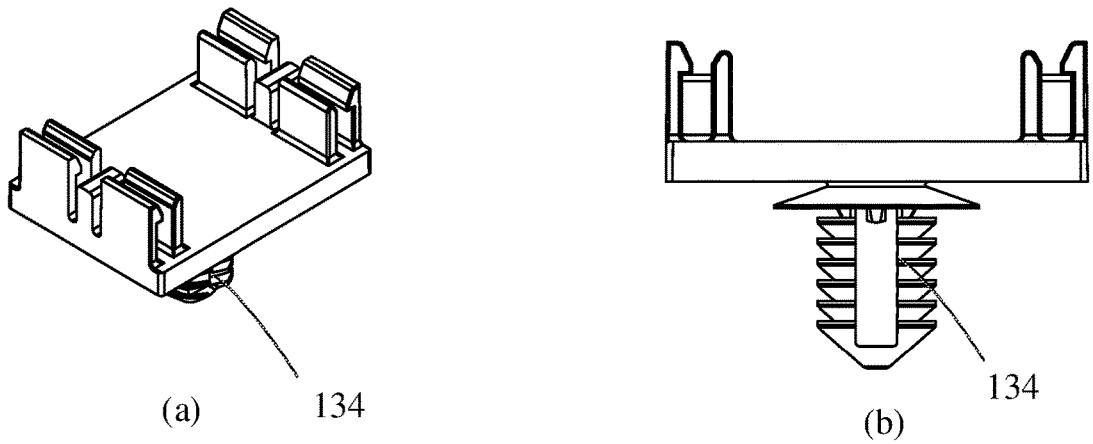
FIG. 11 is a schematic structural diagram of yet another first fixing member disclosed in an embodiment of the present application.

Optionally, as shown in FIG. 10, two sides of a beam 22 are respectively attached to a battery cell 20, and a hole 23 is provided on the beam 22. Correspondingly, as shown in FIG. 11(*a*), the first fixing member 13 is provided with a fixing part 134, and the fixing part 134 is matched with the hole 23 to fix the first fixing member 13 on a surface of the beam 22 close to the fire-fighting pipeline 12. The shape of the fixing part 134 may be any shape matching the hole 23, which is not limited in the present application. FIG. 11(*b*) is the front view of FIG. 11(*a*), and as shown in FIG. 11(*b*), the fixing part 134 is shaped like a fir tree. During installation, the fixing part 134 may be screwed into the hole 23 by rotating the first fixing member 13 for many times, so that the first fixing member 13 is stably fixed on the surface of the beam 22 close to the fire-fighting pipeline 12.

It should be understood that the battery 10 in an embodiment of the present application may include a plurality of battery cells 20 disposed in the first direction X. The first wall 21 of each battery cell 20 is provided with a pressure relief mechanism 211, and the fire-fighting pipeline 12 is provided corresponding to the pressure relief mechanism 211. Therefore, the fire-fighting pipeline 12 may be arranged as a long strip pipeline in the first direction X. Correspondingly, in order to realize the fixing of the fire-fighting pipeline 12, the battery 10 may include one or more first fixing members 13, and the battery 10 may also include one or more second fixing members 14.

In the embodiment of the present application, the battery 10 includes a plurality of battery cells 20 arranged in the first direction X and a plurality of first fixing members 13 and at least one second fixing member 14 arranged in the first direction X. As shown in FIGS. 10 and 11, when the battery 10 includes a plurality of battery cells 20 arranged in the first direction X, the fire-fighting pipeline 12 is usually in a long strip. Therefore, the plurality of first fixing members 13 are provided to fix the fire-fighting pipeline 12, which can make the fire-fighting pipeline 12 more stable.

In an embodiment of the present application, one second fixing member 14 corresponds to a plurality of first fixing members 13, that is, one second fixing member 14 may be matched with a plurality of first fixing members 13, to fix the fire-fighting pipeline 12 between the first fixing member 13 and the second fixing member 14. As shown in FIGS. 10 and 11, the second fixing member 14 extends in the first direction X to reduce the number of the second fixing members 14, thereby improving the processing and assembly efficiency of the second fixing member 14.

It should be understood that the number of first fixing members 13 corresponding to each second fixing member 14 may be flexibly set according to practical applications. For example, the number of first fixing members 13 is usually set to be smaller than the number of battery cells 2, and the embodiment of the present application is not limited to this.

According to an embodiment of the present application, a power consumption device is also provided, including the battery 10 in the foregoing embodiment. Optionally, the power consumption device may be a vehicle 1, a ship or a spacecraft, etc., but this is not limited by the embodiment of the present application.

The battery 10 and the power consumption device of the embodiments of the present application are described above, and a method and device for producing a battery of the embodiments of the present application will be described below. For the parts that are not described in detail, reference is made to the foregoing embodiments.

Figure 12:
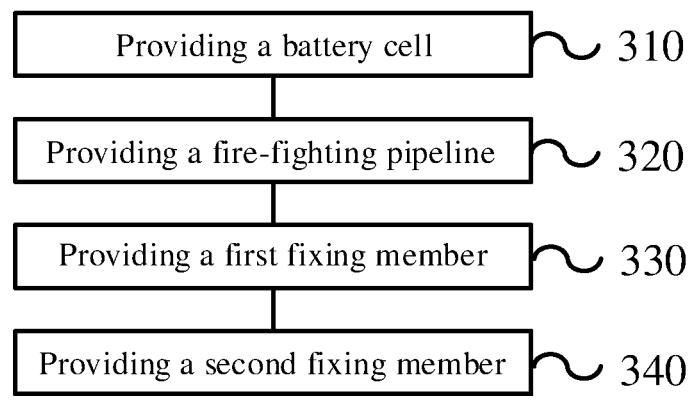
FIG. 12 is a schematic flowchart of a method for producing a battery disclosed in an embodiment of the present application.

FIG. 12 shows a schematic flowchart of a method 300 for producing a battery 10 according to an embodiment of the present application. As shown in FIG. 12, the method 300 may include: S310, providing a battery cell 20, a first wall 21 of the battery cell 20 being provided with a pressure relief mechanism 211, and the pressure relief mechanism 211 being configured to be actuated when an internal pressure or temperature of the battery cell 20 reaches a threshold, to relieve the internal pressure; S320, providing a fire-fighting pipeline 12, the fire-fighting pipeline 12 being configured to accommodate a fire-fighting medium and the fire-fighting pipeline 12 being configured to discharge the fire-fighting medium when the pressure relief mechanism 211 is actuated; S330, providing a first fixing member 13, the first fixing member 13 being disposed on a side of the fire-fighting pipeline 12 close to the first wall 21, the first fixing member 13 being provided with a first limiting part 131 and a second limiting part 132; and S340, providing a second fixing member 14, the second fixing member 14 being disposed on a side of the fire-fighting pipeline 12 away from the first wall 21, the second fixing member 14 being provided with a third limiting part 141 and a fourth limiting part 142, the third limiting part 141 and the first limiting part 131 being matched with each other to fix the fire-fighting pipeline 12 between the first fixing member the member 13 and the second fixing member 14, the fourth limiting part 142 and the second limiting part 132 being matched with each other to limit the second fixing member 14 in a first direction X, and the first direction X being parallel to an extending direction of the fire-fighting pipeline 12.

Figure 13:
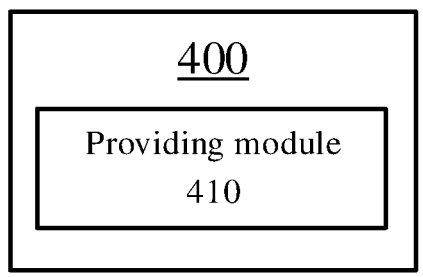
FIG. 13 is a schematic block diagram of a device for producing a battery disclosed in an embodiment of the present application.

FIG. 13 is a schematic block diagram of a device 400 for producing a battery 10 according to an embodiment of the present application. As shown in FIG. 13, the device 400 may include: a providing module 410, configured to: provide a battery cell 20, a first wall 21 of the battery cell 20 being provided with a pressure relief mechanism 211, and the pressure relief mechanism 211 being configured to be actuated when an internal pressure or temperature of the battery cell 20 reaches a threshold, to relieve the internal pressure; provide a fire-fighting pipeline 12, the fire-fighting pipeline 12 being configured to accommodate a fire-fighting medium and the fire-fighting pipeline 12 being configured to discharge the fire-fighting medium when the pressure relief mechanism 211 is actuated; provide a first fixing member 13, the first fixing member 13 being disposed on a side of the fire-fighting pipeline 12 close to the first wall 21, the first fixing member 13 being provided with a first limiting part 131 and a second limiting part 132; and provide a second fixing member 14, the second fixing member 14 being disposed on a side of the fire-fighting pipeline 12 away from the first wall 21, the second fixing member 14 being provided with a third limiting part 141 and a fourth limiting part 142, the third limiting part 141 and the first limiting part 131 being matched with each other to fix the fire-fighting pipeline 12 between the first fixing member the member 13 and the second fixing member 14, the fourth limiting part 142 and the second limiting part 132 being matched with each other to limit the second fixing member 14 in a first direction X, and the first direction X being parallel to an extending direction of the fire-fighting pipeline 12.

Although the present application has been described with reference to some embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery, comprising:
    a battery cell, a first wall of the battery cell being provided with a pressure relief mechanism, and the pressure relief mechanism being configured to be actuated in response to an internal pressure or temperature of the battery cell reaching a threshold, to relieve the internal pressure;
    a fire-fighting pipeline configured to accommodate a fire-fighting medium and the fire-fighting pipeline being configured to discharge the fire-fighting medium when the pressure relief mechanism is actuated;
    a first fixing member, disposed on a side of the fire-fighting pipeline close to the first wall, the first fixing member being provided with a first limiting part and a second limiting part; and
    a second fixing member, disposed on a side of the fire-fighting pipeline away from the first wall, the second fixing member being provided with a third limiting part and a fourth limiting part, the third limiting part and the first limiting part being matched with each other to fix the fire-fighting pipeline between the first fixing member and the second fixing member, the fourth limiting part and the second limiting part being matched with each other to limit the second fixing member in a first direction, and the first direction being parallel to an extending direction of the fire-fighting pipeline;
    wherein:
        the third limiting part comprises a buckle extending in the first direction;
        the fourth limiting part is an opening disposed in the buckle;
        the first limiting part is a groove matched with the buckle;
        the second limiting part is a stopper matched with the opening; and
        when the buckle is buckled in the groove, the stopper is located within the opening to limit movement of the buckle in the first direction.

2. The battery according to claim 1, wherein a length of the stopper in a second direction is greater than a thickness of the buckle in the second direction, and the second direction is parallel to the first wall and perpendicular to the first direction.

3. The battery according to claim 1, wherein the stopper has a first plane perpendicular to the first direction, and a side wall of the opening is matched with the first plane such that the stopper is located within the opening.

4. The battery according to claim 3, wherein the stopper is a cuboid stopper, and the opening is a rectangular opening matched with the cuboid stopper.

5. The battery according to claim 1, wherein:
    the stopper is disposed at one end of the groove in the first direction; and/or
    the groove has two segments in the first direction, and the stopper is disposed between the two segments of the groove.

6. The battery according to claim 1, wherein:
    the buckle is a first buckle, the third limiting part further comprises a second buckle, and the first buckle and the second buckle are separately disposed in the second direction; and
    the groove is a first groove, the first limiting part further comprises a second groove, and the first groove and the second groove are separately disposed in the second direction, and are matched with the first buckle and the second buckle, respectively.

7. The battery according to claim 6, wherein:
    the stopper is a first stopper corresponding to the first groove;
    the second limiting part further comprises a second stopper corresponding to the second groove; and
    the first topper and the second stopper are axisymmetrically distributed with the first direction as an axis.

8. The battery according to claim 6, wherein:
    the stopper is a first stopper corresponding to the first groove;
    the second limiting part further comprises a second stopper corresponding to the second groove; and
    the first stopper and the second stopper are symmetrically distributed about a center.

9. The battery according to claim 6, wherein:
    the stopper is one of one or more first toppers corresponding to the first groove;
    the second limiting part further comprises one or more second stoppers corresponding to the second groove; and
    a number of the one or more first stoppers differs from a number of the one or more second stoppers.

10. The battery according to claim 1, wherein the first fixing member is fixed to a surface of the first wall of the battery cell that is away from an interior of the battery cell.

11. The battery according to claim 1, wherein the first fixing member is fixed to a surface of a beam of a box that is close to the fire-fighting pipeline, the box being configured to accommodate the battery cell.

12. The battery according to claim 11, wherein the first fixing member is provided with a fixing part, and the fixing part is configured to fix the first fixing member to the beam.

13. The battery according to claim 1, wherein the battery cell is one of a plurality of battery cells arranged in the first direction, the first fixing member is one of a plurality of first fixing members arranged in the first direction, and the second fixing member is one of at least one second fixing member.

14. The battery according to claim 13, wherein one second fixing member corresponds to the plurality of first fixing members.

15. A power consumption device, comprising:
the battery according to claim 1, the battery being configured to provide electrical energy.

16. A method for producing the battery according to claim 1, comprising:
providing the battery cell, the first wall of the battery cell being provided with the pressure relief mechanism;
providing the fire-fighting pipeline;
providing the first fixing member, the first fixing member being disposed on the side of the fire-fighting pipeline close to the first wall, the first fixing member being provided with the first limiting part and the second limiting part; and
providing the second fixing member, the second fixing member being disposed on the side of the fire-fighting pipeline away from the first wall, the second fixing member being provided with the third limiting part and the fourth limiting part, the third limiting part and the first limiting part being matched with each other to fix the fire-fighting pipeline between the first fixing member and the second fixing member, the fourth limiting part and the second limiting part being matched with each other to limit the second fixing member in a first direction, and the first direction being parallel to the extending direction of the fire-fighting pipeline.

17. A device for producing the battery according to claim 1, comprising: a providing module configured to:
provide the battery cell, the first wall of the battery cell being provided with the pressure relief mechanism;
provide the fire-fighting pipeline;
provide the first fixing member, the first fixing member being disposed on the side of the fire-fighting pipeline close to the first wall, the first fixing member being provided with the first limiting part and the second limiting part; and
provide the second fixing member, the second fixing member being disposed on the side of the fire-fighting pipeline away from the first wall, the second fixing member being provided with the third limiting part and the fourth limiting part, the third limiting part and the first limiting part being matched with each other to fix the fire-fighting pipeline between the first fixing member and the second fixing member, the fourth limiting part and the second limiting part being matched with each other to limit the second fixing member in the first direction, and the first direction being parallel to the extending direction of the fire-fighting pipeline.

* * * * *